United States Patent [19]

Putsch

[11] Patent Number: 4,946,191
[45] Date of Patent: Aug. 7, 1990

[54] MOTOR VEHICLE SEAT WITH A BACK REST AND AIR BAG ASSEMBLY

[75] Inventor: Peter-Ulrich Putsch, Rockenhausen, Fed. Rep. of Germany

[73] Assignee: Keiper Recaro GmbH & Co., Fed. Rep. of Germany

[21] Appl. No.: 281,230

[22] Filed: Dec. 8, 1988

[30] Foreign Application Priority Data

Dec. 9, 1987 [DE] Fed. Rep. of Germany ....... 3741637

[51] Int. Cl.⁵ ...................... B60R 21/18; B60R 21/22
[52] U.S. Cl. .................................. 280/730; 280/733; 280/743; 297/DIG. 3
[58] Field of Search ............... 280/728, 730, 733, 734, 280/743, 735; 297/391, DIG. 3

[56] References Cited

U.S. PATENT DOCUMENTS

| 3,510,150 | 5/1970 | Wilfert | 280/733 |
| 3,623,768 | 11/1971 | Capener | 280/730 X |
| 3,703,313 | 11/1972 | Schiesterl et al. | 280/733 X |
| 3,753,576 | 8/1973 | Gorman | 280/730 |
| 3,779,577 | 12/1973 | Wilfert | 280/730 |
| 3,827,716 | 8/1974 | Vaughn et al. | 280/730 |
| 3,953,049 | 4/1976 | Surace et al. | 280/730 |
| 4,359,200 | 11/1982 | Brevard et al. | 280/728 X |
| 4,592,523 | 6/1986 | Herndon | 280/733 X |

FOREIGN PATENT DOCUMENTS

| 1555142 | 7/1970 | Fed. Rep. of Germany . |
| 2030863 | 12/1971 | Fed. Rep. of Germany ...... 280/743 |
| 2249988 | 4/1974 | Fed. Rep. of Germany . |
| 2841729 | 4/1980 | Fed. Rep. of Germany ...... 280/730 |

Primary Examiner—Charles A. Marmor
Assistant Examiner—Brian L. Johnson
Attorney, Agent, or Firm—Wigman & Cohen

[57] ABSTRACT

In a vehicle seat, particularly a motor vehicle seat, the back rest of which includes at least one forwardly projecting side wing in the area supporting the shoulders of the user. The side wing is provided with at least one recess in which an air bag and actuating device is located. Upon lateral impact the air bag inflates to protect the sideways movement of the user's head.

10 Claims, 3 Drawing Sheets

MOTOR VEHICLE SEAT WITH A BACK REST AND AIR BAG ASSEMBLY

BACKGROUND OF THE INVENTION

The invention relates to a vehicle seat, particularly a motor vehicle seat, the back rest of which has forwardly projecting side portions in the areas that support the shoulders of the person using the seat.

Where an air bag is available in addition to a seat belt system, and the air bag is inflated in front of the chest and hand of a seat user in the event of an accident, the seat user is protected to a large degree against frontal impact. If, in addition, the person using the seat is also laterally supported in the shoulder area by a vehicle seat of the type described above, then in many cases the upper torso of the seat user can be held in contact with the back rest. This fact, however, increases the chance that the movement of the head relative to the torso is great enough that the neck vertebrae are endangered.

OBJECTS AND SUMMARY OF THE INVENTION

A principal object of the invention, therefore, is to create a vehicle seat that provides increased protection to the user from forces acting laterally to the vehicle in an accident, without inhibiting the necessary freedom of movement and vision of the user. Another object of the present invention is to provide a vehicle seat having a back rest which includes an air bag for supporting the upper portion of the user's torso.

The direction in which the air bag extends as it emerges from the side of the seat can be adapted to meet various requirements. Generally it will be necessary that the air bag extends upward from the side portion of the seat to form a supporting cushion laterally adjacent the head of the seat user. The shape, size and positin thereof can be selected in such a manner that the air bag can itself be supported against the body of the vehicle, for example, against the door post. Because the air bag is housed in a recess provided in the extended wing or side portion of the seat when not inflated, it is hidden from view and thus does not inhibit the freedom of movement and view of the user. The air bag, or at least an additional air bag, can also extend from the shoulder support forward and/or downward. In the former case, the lateral shoulder support is improved, and in the latter case the lateral hip support is improved, which is particularly advantageous if the upper body moves forward and away from the back rest, thus reducing the effectiveness of the shoulder support.

The solution according to the invention is particularly advantageous if the vehicle seat is associated with a seat safety belt system, wherein at least one shoulder belt is attached to the back rest. Under that condition, the shoulder belt would not extend through the space between the user's head and the body of the vehicle, leaving the space free for the air bag.

BRIEF DESCRIPTION OF THE DRAWINGS

The invention will be described in greater detail below with the aid of exemplary embodiments illustrated in the drawings in which.

DETAILED DESCRIPTION OF THE PREFERRED EMBODIMENTS

Figure 1:
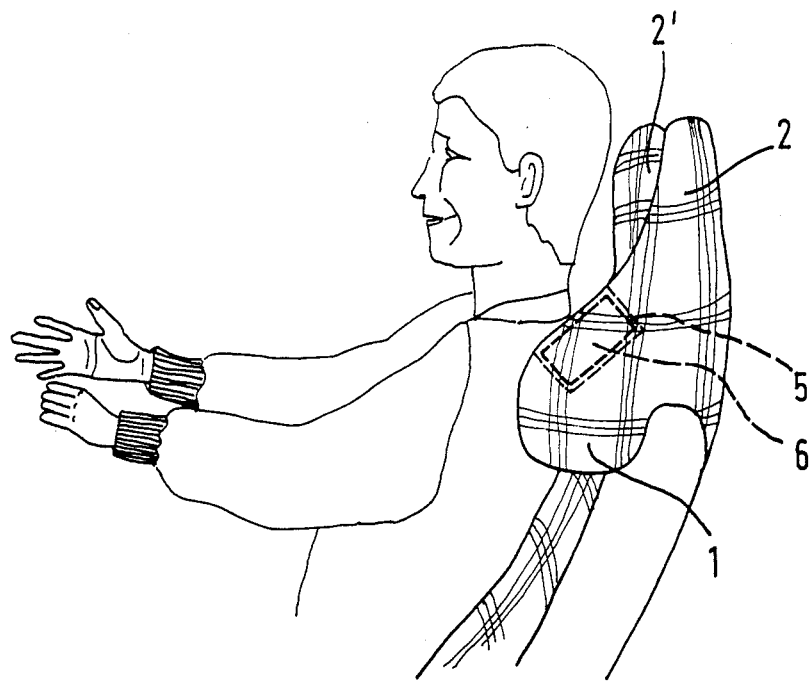
FIG. 1 is an elevational side view in part showing the seat according to the present invention with a deflated air bag in the shoulder portion of the seat.
Figure 2:
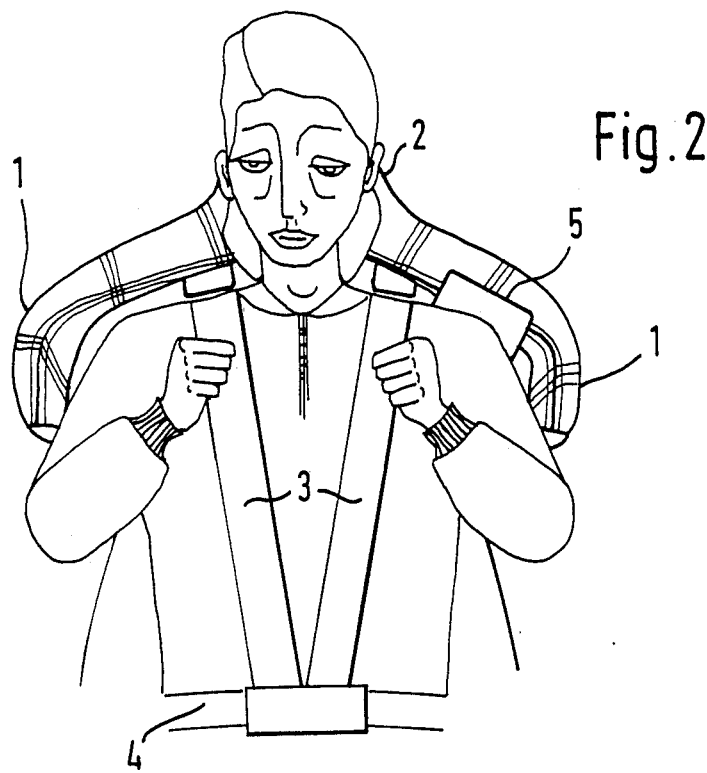
FIG. 2 is an elevational front view in part of the seat embodiment shown in FIG. 1.

As shown in FIGS. 1 and 2, the back rest of a motor vehicle seat has a laterally extending side member or wing 1 on each side of the seat at about the shoulder height of the user of the seat. These two side wings 1 also extend forwardly, so that the back rest together with the side wings 1 wrap around the shoulder areas of the user from behind, thereby also providing lateral support. The side wings 1, however, do not impair the freedom of movement of the upper arms of the seat user, because the width of the seat in the area of the side wings 1 is greater than the shoulder width of the user.

In addition to the side wings 1, a head rest 2 is formed on the back rest and has a concave support surface 2' to receive the head of the user.

Not only the back rest, but also the seat as a whole and its connection with the floor of the vehicle have dimensions such that the associated seat belt can be attached to the seat rather than to the body of the vehicle. As shown in FIG. 2, this seat belt includes two shoulder straps 3 that run from a lap belt 4 over both shoulders of the seat user and enter the back rest at about shoulder height. The shoulder straps 3 do not pass through the space between the head of the user and the vehicle body, as in the conventional case where the shoulder strap is guided to the vehicle body at the side of the user.

Figure 3:
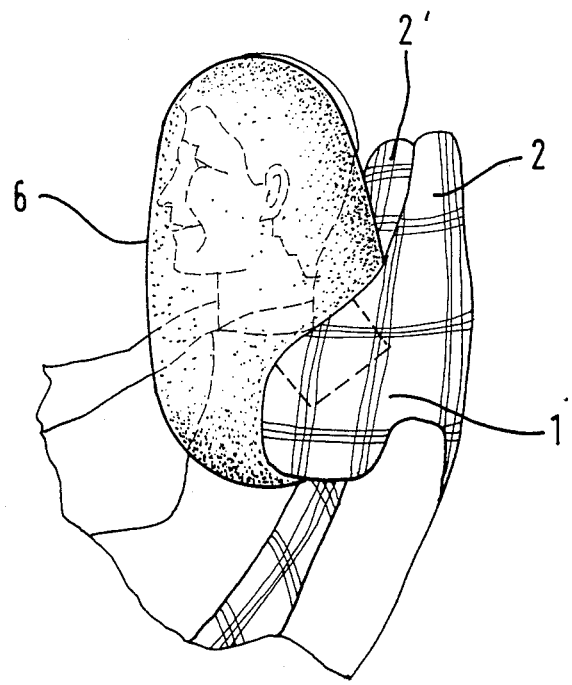
FIG. 3 illustrates the seat embodiments according to FIG. 1, with the air bag inflated.
Figure 4:
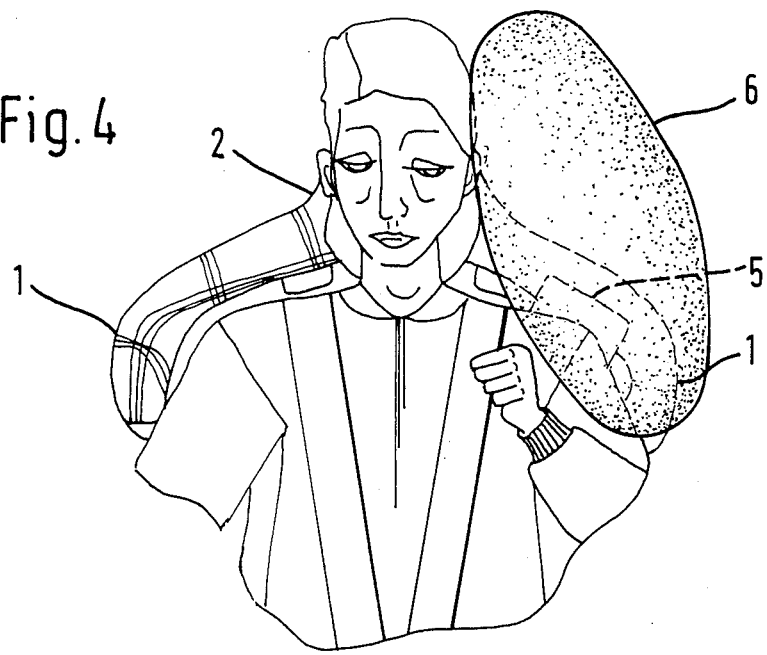
FIG. 4 illustrates the seat embodiment of FIG. 2, with the air bag inflated.

In one exemplary embodiment, the side wing 1 that wraps around the left shoulder of the seat user and provides lateral support thereto is provided with a recess 5 for receiving air bag 6 therein. The access opening to the recess 5 lies both in the upper side and in the side facing the shoulder of the seat user. The air bag 6, and its associated sensor and actuating device (not shown) are housed in the recess 5. The sensor and actuating device, like the air bag 6, are conventional and well known and therefore will not be further described. A soft lid covered with the same covering fabric as the side wings 1, closes the access opening of the recess 5, as long as the air bag 6 is not inflated.

Where the vehicle is hit from the side and the impact value exceeds a predetermined value, the air bag 6 is inflated and extends through the recess opening. As shown in FIGS. 3 and 4, in its inflated condition the air bag 6 fills the space between the head of the user and the body of the vehicle to limit the movement of the user's head toward the vehicle body so as to minimize the danger to the user. By providing a large surface area to support the head of the user the specific pressure exerted on the user's head is kept relatively small.

Optionally, the other side wing 1 could also be equipped with an air bag. However, although this air bag could not simultaneously be supported against the body of the vehicle, it could nevertheless provide additional support to the user's head.

Figure 5:
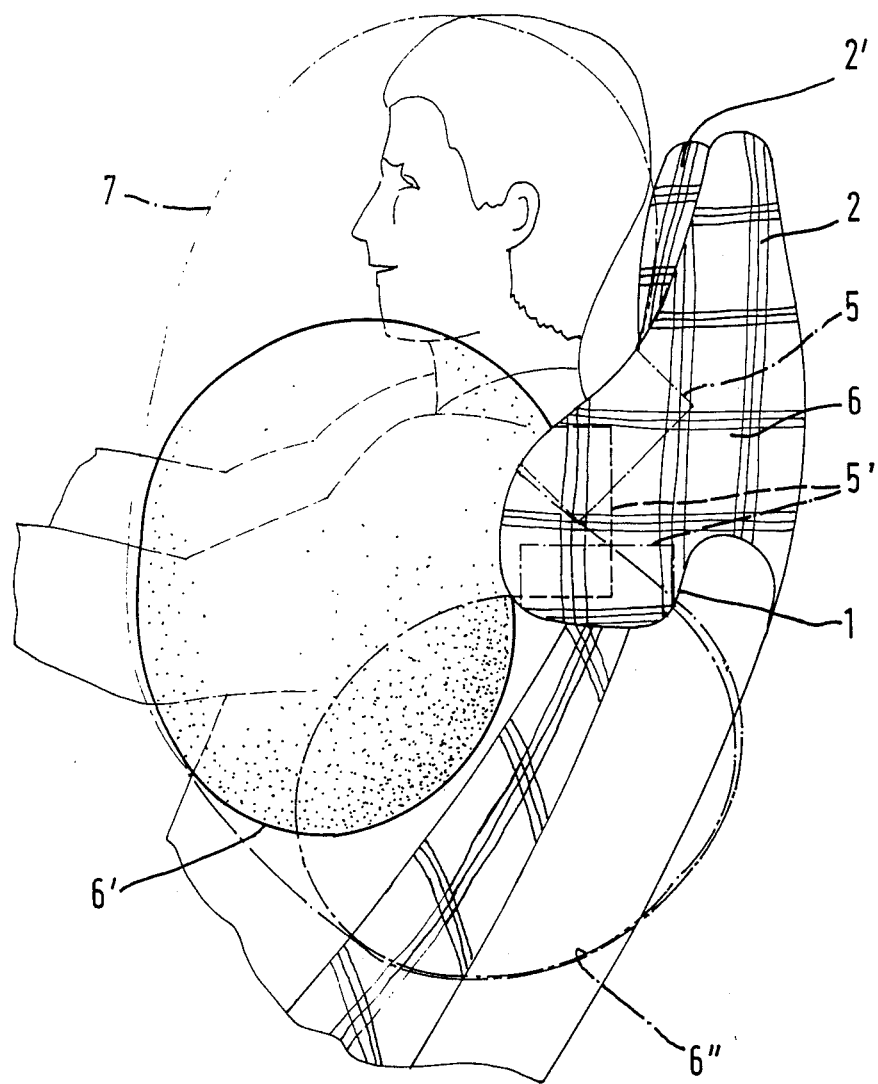
FIG. 5 is an elevational side view, in part, of another embodiment of the present invention.

As shown in FIG. 5, instead of the air bag 6 extending only upwardly from the side wing in its activated condition, or in addition thereto, air bag 6' can be provided that extends upwardly and/or forwardly in its activated condition. Finally, it is also possible to provide an air bag 6" in such a manner that it extends downwardly in its activated condition and provides lateral support to the torso of the seat user in the area of the ribs. The areas in which the inflated air bag or bags can be located is therefore indicated in FIG. 5 by the dashed line 7.

Appropriate recess 5 or recesses 5' can be provided in the side wings and arranged in such a manner that they can open in the direction in which the air bag is to be extended from the side wing of the seat in the activated condition.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. Vehicle seat, particularly a motor vehicle seat for supporting a vehicle user, comprising a back rest having a head rest for supporting only a back side of the user's head, an area supporting the shoulders of the user, and having at least one forwardly projecting side wing in the area supporting the shoulders of the seat user but not laterally of the user's head, wherein the vision of the user is unobstructed, said side wing having an upper surface; said side wing including at least one recess positioned in said upper surface, in which an inflatable air bag is located, whereby said air bag, in the inflated condition of said air bag, forms a support laterally adjacent the head of the seat user.

2. The vehicle seat according to claim 1, wherein said vehicle seat back rest includes a pair of side wings, each positioned in said area supporting the shoulder of the user.

3. The vehicle seat according to claim 1, wherein said back rest includes a plurality of recesses, each of said recesses including an air bag therein.

4. The vehicle seat according to claim 1, wherein the air bag is arranged in the side wing so as to provide a forward support for the user in the inflated condition of said air bag.

5. The vehicle seat according to claim 1, further including a seat belt system having at least one shoulder strap, said shoulder strap being attached to the back rest.

6. The vehicle seat according to claim 2, further including a seat belt system having at least one shoulder strap, said shoulder strap being attached to the back rest.

7. The vehicle seat according to claim 3, further including a seat belt system having at least one shoulder strap, said shoulder strap being attached to the back rest.

8. The vehicle seat according to claim 4, further including a seat belt system having at least one shoulder strap, said shoulder strap being attached to the back rest.

9. The vehicle seat according to claim 1 wherein an additional air bag is arranged in the side wing so as to provide a downward support for the user in the inflated condition of said additional air bag.

10. The vehicle seat according to claim 4, further including an additional air bag, wherein one of said air bags is arranged in the side wing so as to provide a downward support for the user in the inflated condition of the air bag.

* * * * *